United States Patent [19]

Lundberg et al.

[11] Patent Number: 4,579,671

[45] Date of Patent: Apr. 1, 1986

[54] HYDROCARBON SOLUBLE POLYMER COMPLEXES USEFUL AS VISCOSIFIERS IN FRACTURING OPERATIONS

[75] Inventors: Robert D. Lundberg, Bridgewater; Dennis G. Peiffer, East Brunswick, both of N.J.; Lawrence P. Sedillo, Houston; John C. Newlove, Kingwood, both of Tex.

[73] Assignee: Exxon Research and Engineering Co., Florham Park, N.J.

[21] Appl. No.: 651,899

[22] Filed: Sep. 19, 1984

[51] Int. Cl.$^4$ .............................................. E21B 43/26
[52] U.S. Cl. ................... 252/8.55 R; 166/308; 524/516
[58] Field of Search .......... 252/8.5 M, 8.5 P, 8.55 R; 166/308; 524/516, 390, 251

[56] References Cited

U.S. PATENT DOCUMENTS

| | | | |
|---|---|---|---|
| 2,596,843 | 5/1952 | Farris | 252/8.55 X |
| 3,351,079 | 11/1967 | Gibson | 252/8.55 X |
| 3,416,899 | 12/1968 | Schiff | 252/8.55 X |
| 3,758,406 | 11/1973 | Malone et al. | 252/8.55 |
| 3,836,511 | 9/1974 | O'Farrell et al. | 525/341 X |
| 4,322,329 | 3/1982 | Lundberg et al. | 524/385 |
| 4,425,461 | 1/1984 | Turner et al. | 252/8.5 X |
| 4,447,338 | 5/1984 | Lundberg et al. | 252/8.5 |

*Primary Examiner*—Herbert B. Guynn
*Attorney, Agent, or Firm*—Richard E. Nanfeldt

[57] ABSTRACT

A process for fracturing a subterranean formation surrounding a gas or oil well which comprises injecting said subterranean formation under hydraulic pressure with a fluid comprising about 0.1 to about 75 percent of an interpolymer complex dissolved in a solvent system of a nonpolar organic liquid and a polar cosolvent (as desired), said polymer complex comprises the interaction product of a sulfonated polymer and an amine containing polymer, wherein the sulfonate content of the sulfonated polymer is about 4 meq. per 100 gram of polymer to about 200 meq. per 100 gram of polymer and the basic nitrogen content of the amine containing polymer is about 4 meq. per 100 gram of polymer to about 500 meq. per 100 gram of polymer, and by the addition of polar cosolvent to such solution of polymer complex modifying its rheological properties over a wide range and their subsequent use as fracturing fluids.

12 Claims, No Drawings

HYDROCARBON SOLUBLE POLYMER COMPLEXES USEFUL AS VISCOSIFIERS IN FRACTURING OPERATIONS

BACKGROUND OF THE INVENTION

1. Field of the Invention

The present invention relates to a process for the hydraulic fracturing of subterranean formations surrounding oil wells and gas wells by means of injection of a fracturing fluid into the well, wherein the fracturing fluid comprises a solution of a nonpolar organic liquid or oil, and an interpolymer complex and a polar cosolvent, as desired.

2. Description of the Prior Art

Hydraulic fracturing has been widely used for stimulating the production of crude oil and natural gas from wells completed in low permeability reservoirs. The methods employed normally require the injection of a fracturing fluid containing a suspended propping agent into a well at a rate sufficient to open a fracture in the exposed formation. Continued pumping of fluid into the well at a high rate extends the fracture and leads to the buildup of a bed of propping agent particles between the fracture walls. These particles prevent complete closure of the fracture as the fluid subsequently leaks off into the adjacent formation and result in a permeable channel extending from the wellbore into the formation. The conductivity of this channel depends upon the fracture dimensions, the size of the propping agent particles, the particle spacing, and the confining pressures. Studies of conventional fracturing operations indicate that fracture widths seldom exceed about one-fourth inch and that conductivities in excess of about 250,000 millidarcy inches are rarely obtained. The average width and conductivity are considerably lower than these values.

With the advent of declining reserves, the drilling and stimulation of higher temperature wells in increasing the drilling and completion of tight dry gas and water sensitive formation is also on the rise. The industry is relying to a greater extent on hydrocarbon fluids to drill and complete these wells which cannot be treated with the normal water-based fluids, therefore, there has been shown a substantial need for hydrocarbon based viscofiers which exhibit good performance at high temperature.

A desirable formulation both for drilling fluids and hydraulic fracturing fluids would be a homogenous fluid which possesses adequate viscosity. An organic liquid containing a polymeric viscosifiers would meet the above stated requirements.

Since the beginning of recorded oil well production, hydrocarbon based viscosifiers have played an important role in hydraulic fracturing fluids. Some of these viscosifiers have been either metal soaps of fatty acids, or metal soaps of partially esterified phosphates. Both of these impart viscosity to hydrocarbons, but the metal soaps of fatty acids have inherent thermal thinning properties which give them limited utility at higher temperatures. The metal soaps of partially esterified phosphates have the disadvantages of being extremely pH sensitive along with being thermally thinning.

Therefore a viscosifier that has the advantage maintaining viscosity at high temperatures and/or is not susceptible to variations in pH would represent an advancement of the prior art.

The instant invention differs from a number of applications, Ser. Nos. 223,482 filed Jan. 8, 1981, now U.S. Pat. No. 4,361,658; 136,837 filed Apr. 3, 1980, now U.S. Pat. No. 4,322,329; and 106,027 filed Dec. 21, 1979, now U.S. Pat. No. 4,282,130, filed by Robert Lundberg et al, one of the instant inventors. These previously filed applications were directed to the gelling of the organic liquid by a water insoluble, neutralized sulfonated polymer whereas the instant invention is directed to fracturing fluids formed from nonpolar organic liquid and an interpolymer complex.

In a U.S. Ser. No. 547,955, filed Nov. 2, 1983, two polymers are mixed to produce an interpolymer complex which at relatively low concentration forms a three-dimensional network with a gel-like behavior.

In U.S. Ser. No. 547,955 the interpolymer complexes in hydrocarbon solutions are obtained by mixing two polymers which are strongly associated with each other. One polymer will contain anionic groups along or pendant to its backbone, and the other polymer will contain cationic groups. The coulombic interaction between cationic and anionic groups leads to network formation, if each chain contains interacting groups in multiple locations.

In this application, we describe the use of this multi-polymer complex as a hydrocarbon viscosifier when sufficient aromatic character is present to allow solubility of the styrene-vinyl pyridine copolymer. We also describe by the addition of non-aromatic character to the styrene-vinyl pyridine backbone via a hydrocarbon soluble vinyl monomer that hydrocarbon soluble multi-polymer complexes can be made which can be used as hydrocarbon viscosifiers. The multi-polymer complexes concentration can be varied to obtain a variety of rheological properties. Furthermore we describe that by variations of sulfonation on EPDM, the use of other metal salts and the variation of the concentration of 4-vinyl pyridine or the use of other amines or amine-like groups that a variety of rheological properties can be obtained. And finally, these multi-polymer complexes are useful in viscosifying hydrocarbon solutions both for hydraulic fracturing and for drilling at high temperature.

The incentives for developing fractures with conductivities sufficient to permit the application of fracturing to high permeability reservoirs are substantial. The low permeability formations in which conventional methods are used generally produce at low rates and hence total production remains low even though an improvement of several fold is obtained. In reservoirs of higher permeability, the initial production rates are normally much higher and hence a successful fracturing operation may product a much greater improvement in terms of incremental barrels of oil per day. This is true even though the percentage improvement may be somewhat smaller than in a reservoir of lower permeability. Efforts to extend fracturing opertions into undamaged reservoirs with permeabilities substantially in excess of about 15 to 20 millidarcies have in the past been largely unsuccessful.

SUMMARY OF THE INVENTION

The fracturing method of this invention is carried out by injecting fracturing fluid through a string of tubing of casing into a fracture. Injection of the high viscosity fluid is continued until a fracture of sufficient width to produce a highly conductive channel has been formed. The fracturing fluid enters into the fracture, whereupon efficient transmission of pressure pulses can occur easily within the fracture zone.

The injected fluid is then permitted to leak off into the formation until the fracture has closed sufficiently to hold the particles in place.

The high viscosity fluid can be accomplished in a number of ways with the intepolymer complex solutions.

(1) The first method being the variation of the interpolymer complexes in part or in total to obtain a variety of rheological properties.

(2) The polymers of the interpolymer complex are pumped separately and co-mingled in the tubular goods forming a complex during pumping.

(3) A polar cosolvent in incremental amounts can be added to the nonpolar organic liquid-interpolymer complex solution, modifying and controlling the rheological properties as desired.

(4) A concentrate of the interpolymer complex in the nonpolar solvent containing a polar cosolvent to render the solution of low viscosity. This would then be pumped through surface equipment and comingled on the surface with additional nonpolar hydrocarbon diluting the polymer complex and forming a complex of high viscosity.

(5) A polar cosolvent can be added to the interpolymer complex solution reducing its viscosity. This solution would then be pumped and comingled in the tubular goods with water, extracting the polar cosolvent from the interpolymer complex/non-polar hydrocarbon solution forming a high viscosity complex which would be used in this and in all cases as fracturing fluids.

Accordingly, it is a primary object of the instant invention to describe an economical fracturing process for fracturing a subterranean formation by means of a fracturing fluid which comprises a nonpolar organic liquid, a polar cosolvent, as desired and an interpolymer complex.

GENERAL DESCRIPTION

The present invention relates to a process for the fracturing of a subterranean formation surrounding an oil well or gas well in order to increase the recovery of the oil or gas. The process includes the steps of forming a solvent system of a nonpolar organic liquid or oil and a polar cosolvent, the polar cosolvent being less than about 15 weight percent of the solvent systems and a viscosity of the solvent systems being less than about 1,000 cps; dissolving an interpolymer complex in the solvent system to form a solution; this solution may then be modified rheologically if needed, injecting this solution in the well under hydraulic pressure to fracture the subterranean formation. The interpolymer complex solution can generate a viscous solution by manipulation of the polymer and/or the use of a polar cosolvent to control the solution viscosity(ies). As well the use of water or other polar cosolvent to extract the polar cosolvent rendering a thickened interpolymer-complex solution which can be used as a fracturing fluid.

The thickened polymer solution having a viscosity greater than 50 cps acts as a suspending agent for propping means to be placed within the fracture of the subterranean formation. The thickened solution is formed by the polymer dissolution, wherein the polymer solution comprises a water insoluble polymer complex, a nonpolar organic liquid and a polar cosolvent, wherein the solution has a viscosity less than 2,000 cps. The concentration of polymer complex in the solution is from about 0.01 to about 25 weight percent, preferably 0.2 to 10 weight percent, more preferably about 0.3 to about 9, and most preferably about 0.4 to about 8. In certain specific applications, upon the addition of water to the solution of the interpolymer complex, the polar cosolvent rapidly transfers from the solution of the interpolymer complex, nonpolar organic liquid and the polar cosolvent to the aqueous phase which causes immediate gelation of thickening of the nonpolar organic liquid. The system may, alternatively be a solution of a non-polar solvent, a polymer complex and a polar cosolvent. The polar cosolvent is hydrocarbon soluble and is to modify the rheological properties of the solution, in such a fashion so that it may be used as a fracturing fluid.

The polymer complex of the instant invention is formed from the interaction of a sulfonated polymer and an amino-containing polymer. The sulfonated polymer is characterized as having polymer backbones which are substantially soluble in the organic liquid, and pendant sulfonate groups which are substantially insoluble in the organic liquid.

The number of sulfonate groups contained in the sulfonated polymer of the polymer complex is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation, the polymer can be considered to be prepared from a hypothetical monomer having an average molecular weight, which is the average of the two monomer components. Similarly for terpolymers, the same averaging concepts apply; however, three components are involved. For example, ethylene-propylene-ethylidene norbornene (ENB) is a preferred polymer backbone for this invention. A representative terpolymer would have a composition (weight percent) or 50% ethylene, 45% propylene and 5% ENB. This composition has an average repeat unit molecular weight of about 38.9. Thus, sulfonation of this composition, which occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milliequivalents (meq.) of sulfonic acid groups per 100 gms of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general the sulfonated polymer will comprise from about 4 meq. up to 200 meq. of sulfonate groups, per 100 g. of polymer, more preferably about 10 meq. to about 100 meq. The sulfonated polymers in the instant invention are neutralized with the basic materials selected from the groups consisting of Groups IA, IIA, IVA, VIA, VIIA, VIIIA, IB and IIB of the Periodic Table of the Elements and lead, tin, aluminum and antimony. A preferred counter ion for this invention is zinc, as explained below. Sulfonated polymers which are the subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonates styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers such as isoprene-styrene sulfonate copolymer formed by a free radical copolymerization process.

Neutralization of the cited sulfonated polymers with appropriate metal hydroxides, metal acetates, metal oxides, etc. can be conducted by means well-known in the art. For example, the sulfonation process as with Butyl rubber containing a small 0.3 to 1.0 mole % unsaturation, can be conducted in a suitable solvent such as toluene with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal or in some excess to the amount of free acid in the polymer plus any unreacted reagent which still is present. It is preferred that the amount of neutralizing agent be equal to the molar amount of sulfonating agent originally employed, plus 10% more to ensure full neutralization. The use of more of such neutralization agent is not critical. Sufficient neutralization agent is necessary to affect at least 50% neutralization of the sulfonic acid groups present in the polymer, preferentially at least 90%, and most preferably essentially complete neutralization of such acid groups should be affected.

The degree of neutralization of said ionomeric groups may vary from 50 to 500 mole %, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg., Ca, etc. We have found that these species do not interact as strongly with amine groups as the more preferred species described below. Those metals are commonly defined as members of the transition elements (see chemical text: CHEMICAL PRINCIPLES AND PROPERTIES, by M. J. Sienko and R. A. Plane, McGraw Hill Book Co., 1974, page 19). These metal cations are best exemplified by zinc and intereact strongly with pyridine and similar amines. As a consequence, a zinc neutralized sulfonated polymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony, titanium, zirconium, chromium, aluminum and lead as suitable cations.

A third species which is preferred is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs).

The amine-containing polymer of the polymer complex is typically a polymeric backbone where the nitrogen elements are in the chain or pendant to it. Such a polymer may be obtained by direct copolymerization of a monomer containing the basic moiety with other monomers, or by grafting a monomer containing the basic moiety on to a polymerized chain. Monomers can be chosen from vinyl monomers leading to hydrocarbon soluble polymers such as styrene, t-butyl styrene, acrylonitrile, isoprene, butadiene, acrylates, methacrylates and vinyl acetate. Monomers containing a basic moiety will be those who contain amine or alkyl amine groups or pyridine groups, such as vinyl pyridine.

A preferred basic polymer for this invention is a polymer which is soluble in crude and distilled paraffinic, naphthenic, aliphatic and aromatic solvents. A specified preferred polymer is t-butyl styrene-co-vinyl pyridine, though lauryl methacrylate covinyl pyridine or other polymers similar to this are common.

The amount of vinyl pyridine in the amine-containing polymer can vary widely, but should range from less than 50 weight percent down to at least 0.5 weight percent. Preferably, the amine content in the basic polymer is expressed in terms of basic nitrogen. In this respect, the nitrogen content in amides and similar non-basic nitrogen functionality is not part of the interacting species. A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The sulfonated polymers of the instant invention may vary in number average molecular weight from 1,000 to 10,000,000, preferably 5,000 to 500,000, most preferably from 10,000 to 200,000. These polymers may be prepared by methods known in the art; for example, see U.S. Pat. No. 3,836,511, hereby incorporated by reference.

It is evident that the sulfonated polymers covered within this invention encompass a broad class of hydrocarbon polymer systems. It is important that these hydrocarbon polymer backbones (in the absence of the sulfonate groups) be soluble in the organic liquid. To achieve the desired solubility, it is required that the polymer to be employed possess a degree of polarity consistent with that solvent. This solubility relationship can be readily established by anyone skilled in the art simply by appropriate texts (e.g., POLYMER HANDBOOK, edited by Brandrup and Immergut, Interscience Publishers, 1967, Section IV-341). In the absence of appropriate polymer-solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with sulfonate groups to achieve the objectives of this invention. It is also apparent that polymers will be too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must posses a level of crystallinity of less than 25%. Thus, these acceptable polymers can be considered substantially noncrystalline.

The preferred sulfonated EPDM terpolymers for use in the instant invention are prepared by sulfonation of an EPDM-containing ethylene norbornene units. Other specific examples of preferred ionomeric polymers which are useful in the instant invention include sulfonated polystyrene, sulfonated poly-t-butyl styrene, sulfonated polyethylene, (substantially non-crystalline) and sulfonated polyethylene copolymers, sulfonated polypropylene (substantially noncrystalline), and sulfonated polypropylene copolymers, sulfonated styrene-methyl methacrylate copolymers, (styrene) acrylic acid copolymers, sulfonated polyisobutylene, sulfonated ethylene-propylene terpolymers, sulfonated polyisoprene, sulfonated polyvinyl toluene, sulfonated polyvinyl toluene copolymers and isoprene-styrene sulfonate copolymers formed by a free radical copolymerization process.

The sulfonated polymers of the insatant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The t-butyl styrene-vinyl pyridine copolymer of the polymer complex is formed by free radical copolymerization using techniques well-known in the polymer literature. Such polymers can be prepared by a variety of techniques well-known in the polymer literature. Such polymers can be prepared by a variety of techniques with styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The vinyl pyridine content of the preferred copolymer of t-butyl sytrene and vinyl pyridine is about 0.5 to about 50 mole percent, more preferably about 0.5 to about 20 mole percent and most preferably about one to about 20 mole percent. The number average molecular weight is about 10,000 to about 10,000,000, preferably about 20,000 to a bout 5,000,000 and most preferably about 30,000 to about 2,000,000.

The hydrocarbon solution of the polymer complex of the sulfonated polymer and the t-butyl styrene-vinyl pyridine copolymer is formed by forming a first solution of the sulfonated polymer in an organic liquid and a second solution of the t-butyl styrene-vinyl pyridine copolymer in the organic liquid, wherein the organic liquid which has a solubility parameter of less than 9.5 and is selected from the group consisting of mineral oil, synthetic oil, crude and distilled alkanes, cycloalkanes paraffinics, naphthenics, and aromatics such as benzene, toluene, ethyl benzene and xylene and mixtures thereof. The concentration of the sulfonated polymer in the first solution is about 0.05 to about 10 grams per 100 ml of organic liquid, more preferably about 0.1 to about 5. The concentration of the t-butyl styrene-vinyl pyridine copolymer in the second solution is about 0.05 to about 10 grams per 100 ml of the organic liquid, more preferably about 0.1 to about 5, and most preferably about 0.1 to about 2. The two solutions of the sulfonated polymer and the t-butyl styrene-vinyl pyridine copolymer are mixed together to form the polymer complex, wherein either the sulfonated polymer or t-butyl styrene-vinyl pyridine copolymer can be substantially in excess of the other. The dissolution process is not limited to the above scheme for example the two polymers can be simultaneously dissolved in the solvent. The mole ratio between the sulfonate-containing polymer and the amine-containing polymer in solution is about 1:15 to 15:1.

The method of the instant invention can include incorporating a cosolvent in order to weaken or totally disrupt the ionic linkages which weld the intercomplex polymer together. For example, a polar cosolvent can be added into the mixture of organic liquid and polymer complex, to solubilize the pendant sulfonate groups. The polar cosolvent will have a solubility parameter of at least 10.0, more preferably at least 11.0, and may comprise from 0.1 to 40, preferably 0.5 to 20 weight percent of the total mixture of organic liquid, ionomeric polymer, and polar cosolvent.

There is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S_p$, then we require that:

$$S_p \geq S_L + 1.0$$

In other words, the polar cosolvent will be substantially more polar than the organic liquid to be thickened.

Normally the polar cosolvent will be a liquid at room temperature; however, this is not a requirement. It is required that the polar cosolvent be soluble or miscible with the organic liquid at the levels employed in this invention. Under normal circumstances, this miscibility requirement precludes the use of water as a polar cosolvent. Suitable polar cosolvents include alcohols, amines, water miscible amides, phosphates and lactones. The polar cosolvent must be present in amounts of from 10 to 600 moles per mole of ionic group in order to give the desirable results of the instant invention and preferably from 20 to 400 moles per mole of ionic group.

DESCRIPTION OF THE PREFERRED EMBODIMENTS

The following are preferred embodiments of the instant invention.

Example 1

Preparation of t-butyl Styrene Vinyl Pyridine Copolymer

A copolymer of t-butyl styrene and vinyl pyridine was prepared via a free radical emulsion copolymerization process. The preparation was conducted as follows:

In a suitable, stirred reaction vessel under a nitrogen blanket the following ingredients were charged:
120 ml. distilled water
50 g. t-butyl styrene
3.2 g sodium lauryl sulfate
0.1 g dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finally disperse the coagulated polymer. The suspension was filtered and dried in a vacuum oven at 60° C. for 24 hours.

The resulting product represented 80% conversion of the reactive monomers and contained 1.68% nitrogen corresponding to 12.5 mole % 4-vinyl pyridine incorporation.

Example 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated MS-14. The resulting polymer was available as a free-flowing crumb and employed in that form as a blending component in the following examples.

Example 3

The following solutions of polymers in xylene A were prepared:

Solution A:
0.5 weight % of MS-14, a zinc-Sulfo-EPDM was dissolved in xylene MS-14 is a zinc salt of sulfonated EPDM terpolymer. The sulfonation level was 10 milliequivalents per 100g backbone. The backbone was a 90,000 weight average molecular weight EPDM with a content of 55 weight % ethylene, 45 weight % propylene, and 5 weight % ethylidene-norbornene (ENB).

Solution B:
0.5 weight % of tertiary-butyl-styrene/vinylpyridine copolymer (TSB-VPyr) designated 10563-78 was dissolved in xylene. The TBS-VPyr copolymer contained about 10 mole % VPyr and had an intrinsic viscosity in xylene at 25° C. of 4.3 (in the order of 1 million MW).

Both solutions were readily prepared by mild stirring using a magnetic stirrer.

Solutions A and B were further combined to yield instantaneous interpolymer complexes in solutions at a total polymer concentration of 0.5 weight %. This was done at various ratios and the viscosity-shear rate relation of these solutions was measured by a Haake Rotovisco CV-100 viscometer at 25° C. The low shear viscosity of these solutions at 0.6 sec$^{-1}$ was:

| Solution | Parts A/Parts B | Moles $SO_3^-/N^+$ | Viscosity, cP |
|---|---|---|---|
| B | 0/100 | 0 | 3.6 |
| C | 25/75 | 0.03 | 4.9 |
| D | 50/50 | 0.10 | 15.0 |
| E | 65/35 | 0.18 | 33.0 |
| F | 75/25 | 0.30 | 1420 |
| G | 85/15 | 0.57 | 3750 |
| H | 90/10 | 0.90 | 317 |
| I | 95/5 | 1.90 | 7.5 |
| A | 100/0 | | 2.5 |

The sharp increase in viscosity for the mixed solutions over the individual ones (A and B) suggests a creation of a large polymeric network in the xylene solution.

TESTING PROCEDURES

Presented in Table 1-3 are representative data on the rheological properties of hydrocarbon soluble interpolymer complexes composed of the zinc salt of EPDM (10 milli equivalent zinc ion) and a copolymer of styrene and 4-vinyl pyridine composed of approximately 90 mole % styrene and 10 mole % 4-vinyl pyridine. The polymers were dissolved separately into xylenes as stock solutions on a weight percentage basis. Portions of the two stock solutions were combined with vigorous stirring for adequate mixing and properties measured.

Subsequently, the samples were heated under constant shear on a FANN 50C rheometer of (170 sec$^{-1}$) and periodically reduced to (85 sec$^{-1}$) for rheological property measurement. The testing was completed by cooling the sample and measuring a final rheology. The viscosities yielded show that these hydrocarbon soluble interpolymer complexes are very effective at enhancing rheological properties of hydrocarbons with selectively good viscosity stability.

The rheological properties as shown in Tables 1-3 are representative of the data that can be found in both drilling and hydraulic fluids.

TABLE 1

0.675% w/w Zn—Sulfo EPDM
0.75% w/w Styrene-vinyl pyridine
dissolved in Xylenes

| Time (Min) | Temp + (°F.) | Viscosity @ 170 Sec$^{-1}$ |
|---|---|---|
| 0 | 75 | 68 |
| 15 | 100 | 33 |
| 30 | 150 | 32 |
| 60 | 75 | 62 |

TABLE 2

1.25% w/w Zn—Sulfo EPDM
0.5% w/w Styrene-vinyl pyridine
dissolved in Xylenes

| Time (Min) | Temp + (°F.) | Viscosity @ 170 Sec$^{-1}$ |
| --- | --- | --- |
| 0 | 70 | 655 |
| 15 | 125 | 563 |
| 60 | 150 | 555 |
| 75 | 225 | 165 |
| 105 | 300 | 93 |
| 190 | 300 | 66 |
| 270 | 70 | 250 |

TABLE 3

0.5% w/w Zn—Sulfo EPDM
0.5% w/w Styrene-vinyl pyridine
dissolved in Xylenes

| Time (Min) | Temp + (°F.) | Viscosity @ 170 Sec$^{-1}$ |
| --- | --- | --- |
| 0 | 75 | 909 |
| 15 | 140 | 635 |
| 30 | 150 | 515 |
| 80 | 150 | 445 |
| 165 | 75 | 813 |

What is claimed is:

1. A process for fracturing a subterranean formation surrounding a gas or oil well which comprises injecting into said subterranean formation under fracturing pressure a fluid comprising about 0.01 to about 25 weight percent of a polymer complex dissolved in a solvent system of a nonpolar organic liquid hydrocarbon having a solubility parameter of less than 9.5, said polymer complex comprises the interaction product of a sulfonated polymer and an amine containing polymer which is hydrocarbon soluble, wherein the sulfonated polymer is selected from the group consisting of sulfonated polystyrene, sulfonated EPDM terpolymer, sulfonated polyisoprene, sulfonated ethylene, sulfonated propylene, sulfonated ethylene/propylene copolymers, sulfonated styrene/acrylonitrile copolymers and sulfonated styrene/methyl methacrylate copolymers and the sulfonate content of the sulfonated polymer is about 4 meq. per 100 gram of polymer to about 200 meq. per 100 gram of polymer and the basic nitrogen content of the amine containing polymer is about 4 meq. per 100 gram of polymer to about 500 meq. per 100 gram of polymer, wherein the amine containing polymer is a copolymer of vinyl pyridine with other vinyl monomers and the number average molecular weight of said amine containing polymer is about 10,000 to about 10,000,000, and the number average molecular weight of said sulfonated polymer is from 1,000 to 10,000,000 and wherein the mole ratio of said sulfonated polymer to said amine-containing polymer is about 1:15 to 15:1.

2. The process of claim 1, wherein said sulfonate groups are neutralized with basic compounds selected from Groups IIA, IVA, VIA, VIIA<VIIIA, IB, and IIB of the Periodic Table of Elements, and basic lead, aluminum, tin and antimony compounds.

3. The process of claim 2, wherein the neutralized sulfonated polymer contains zinc as the counterions.

4. The process of claim 2, wherein said sulfonated polymer is derived from an EPDM terpolymer.

5. The process of claim 3, wherein the solvent system further includes a polar cosolvent having a solubility parameter of at least 10.

6. The process of claim 1, wherein the vinyl pyridine containing polymer is a copolymer of t-butyl styrene and vinyl pyridine.

7. The process of claim 1, wherein said sulfonated polymer is in excess of said vinyl pyridine-containing polymer.

8. The process of claim 1, wherein said vinyl pyridine-containing polymer is in excess of said sulfonated polymer.

9. The process of claim 5, wherein said polar cosolvent is selected from the group consisting of alcohols and amines.

10. The proces of claim 5, wherein said polar consolvent has a boiling point of at least 50° C.

11. A process according to claim 5 wherein said polar cosolvent and is water miscible.

12. A process according to claim 1 wherein said organic liquid hydrocarbon is selected from the group consisting of benzene, toluene, ethyl benzene, xylene and mixtures thereof.

* * * * *